March 8, 1932.  W. H. GOSCH ET AL  1,848,474
APPARATUS FOR CONDITIONING HOSIERY AND THE LIKE
Filed April 2, 1929  5 Sheets-Sheet 5
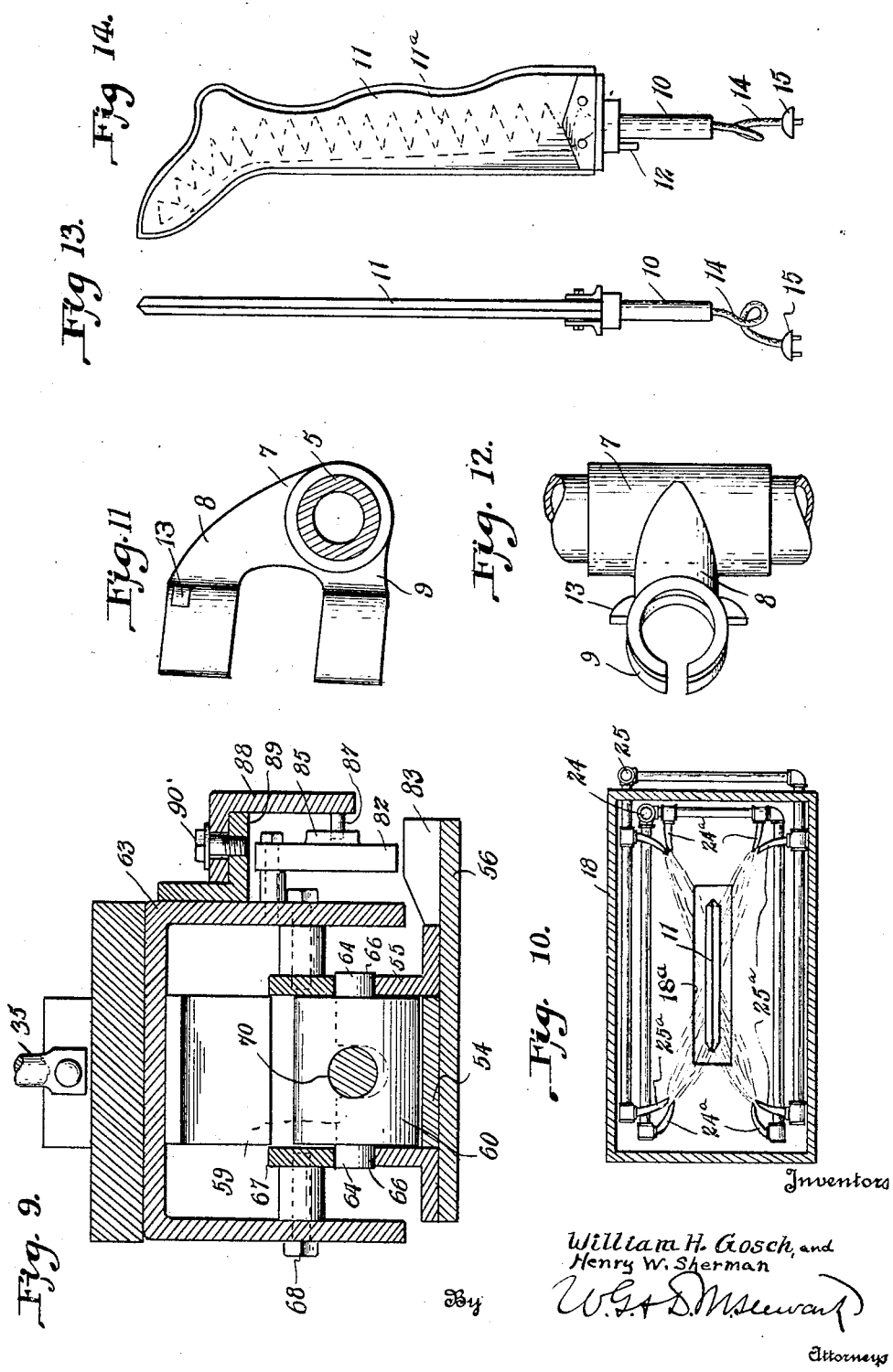

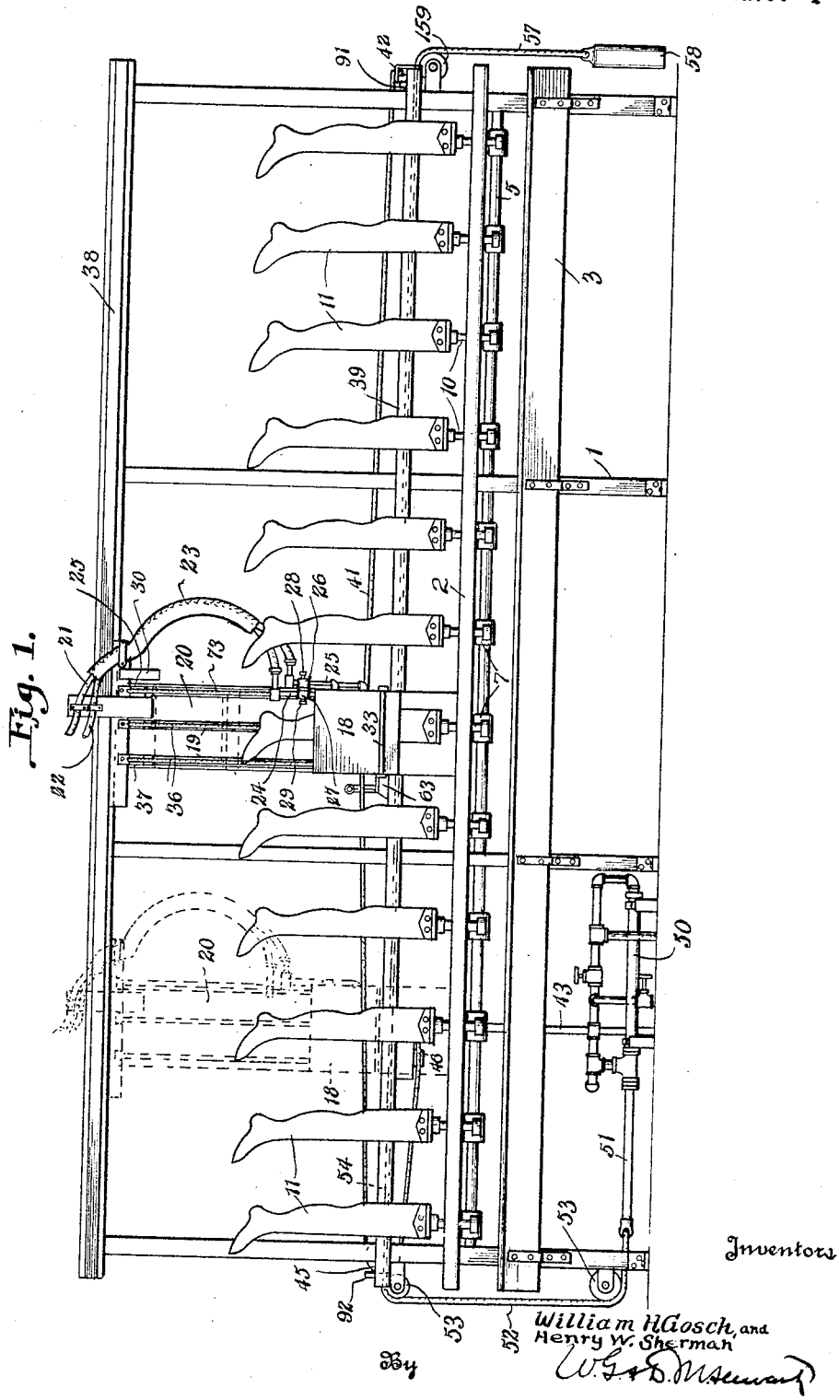

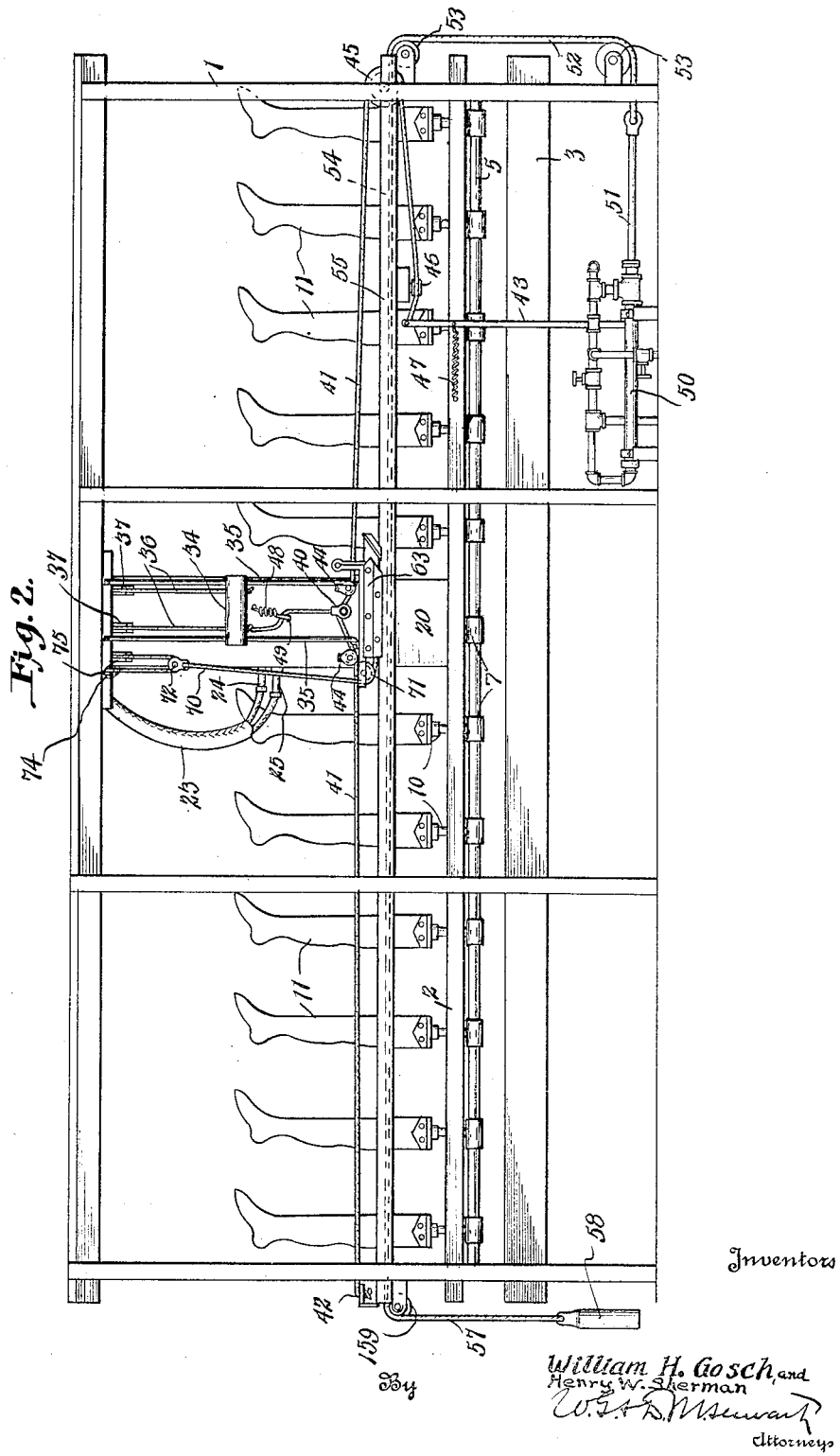

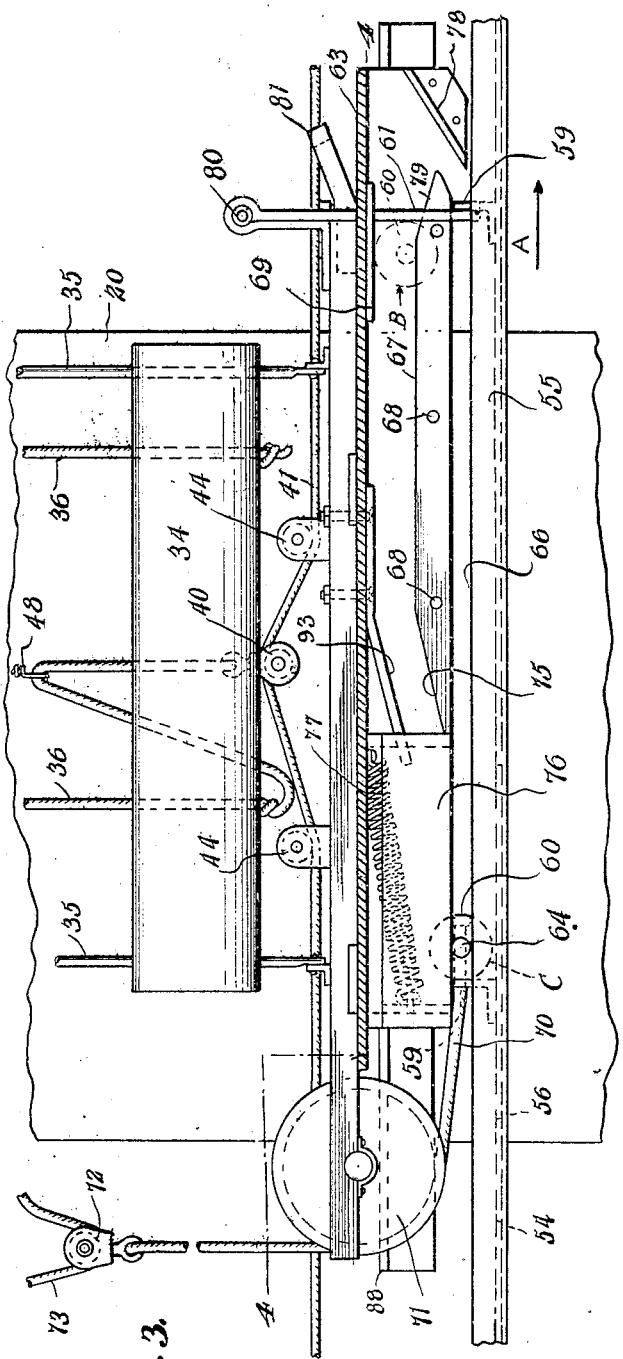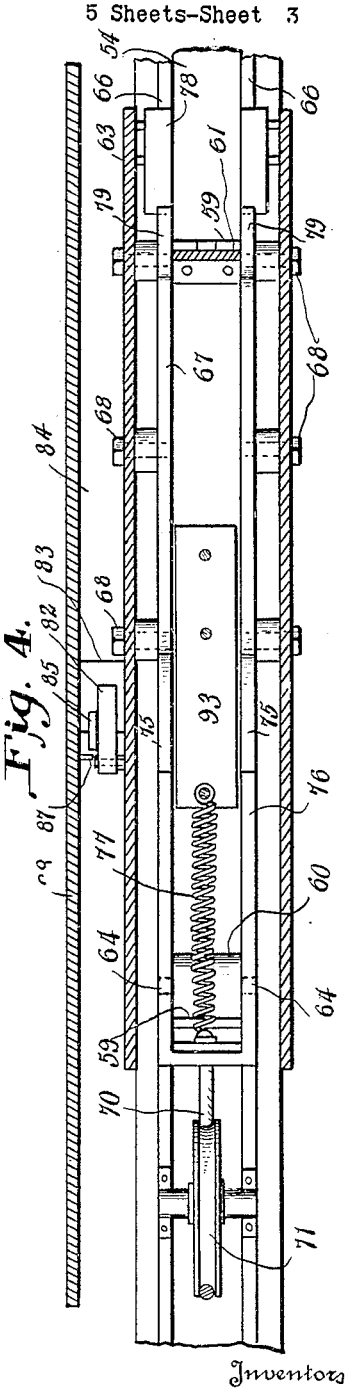

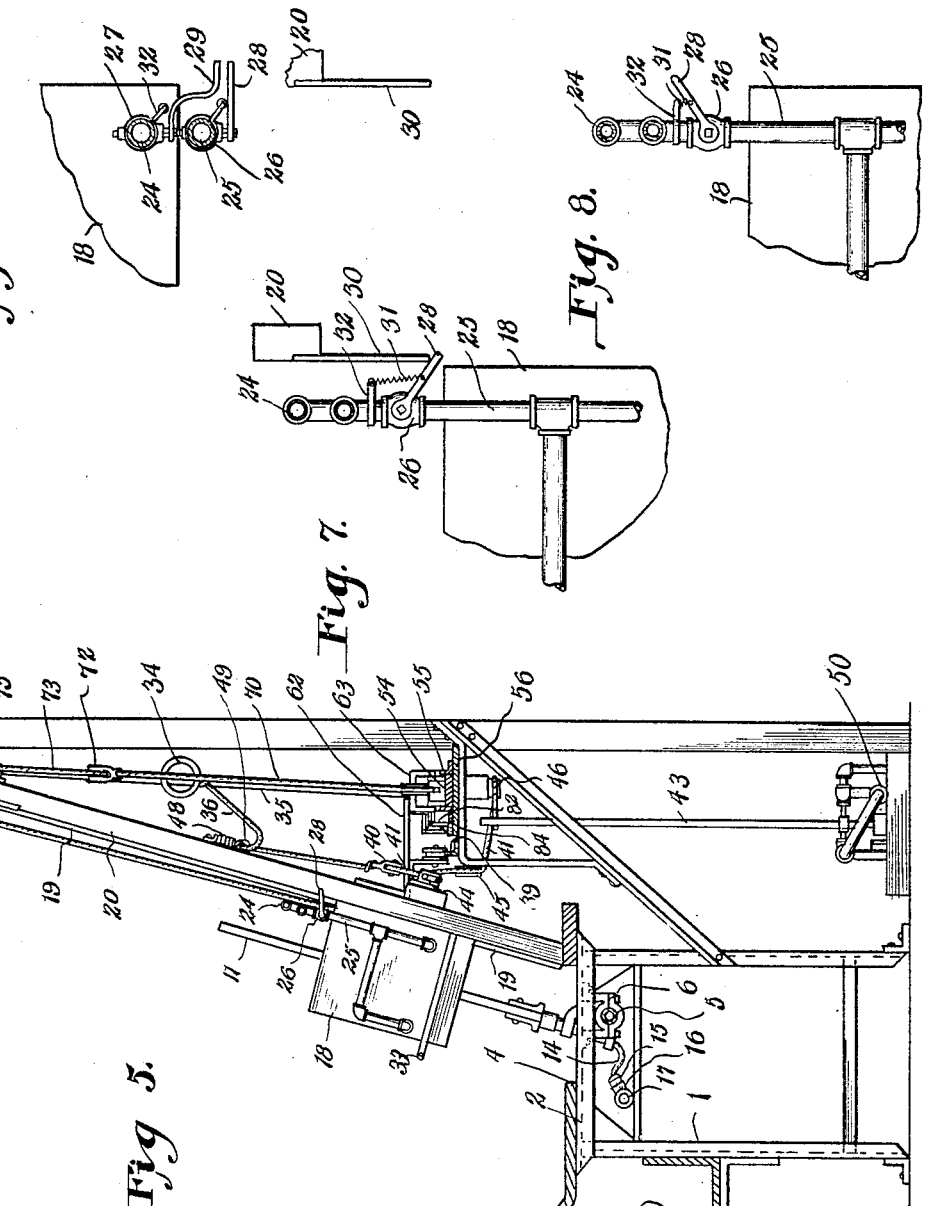

Patented Mar. 8, 1932

1,848,474

UNITED STATES PATENT OFFICE

WILLIAM H. GOSCH AND HENRY W. SHERMAN, OF READING, PENNSYLVANIA, ASSIGNORS TO THE NOLDE AND HORST COMPANY, OF READING, PENNSYLVANIA, A CORPORATION OF PENNSYLVANIA

APPARATUS FOR CONDITIONING HOSIERY AND THE LIKE

Application filed April 2, 1929. Serial No. 351,884.

This invention relates to an improved method and apparatus for conditioning textile material or garments, and more especially to a novel system for conditioning stockings while the latter are arranged on heated boards or forms. This conditioning consists in moistening the stockings by spraying them while stretched over the forms which latter are heated for the purpose of drying the moistened stockings. This heating is preferably accomplished internally of the form, although from the following description it will be apparent that exterior heat may be applied as by a heating chamber or the like.

The primary object of the invention is to provide a conditioning system in which each stocking will be uniformly subjected to the same amount of moistening, so that the finished articles will be of uniform appearance.

Another object is to provide a stocking conditioning apparatus, including means for supporting a series of loaded stocking forms, and a spraying box which is shiftable along the line of stocking forms, and is adapted to be lowered and elevated relatively to each form, for the purpose of uniformly moistening the stockings on the forms. Another object is to provide a structure of this character, in which air and water nozzles in the spraying box will be automatically opened when the box is lowered and automatically closed when the box reaches its uppermost position. A further object is to provide means for automatically raising the spraying box at the same speed at all times.

A still further object is to furnish an apparatus for the above purposes, in which the spraying box is mounted on a track supported carriage, and is combined with means for automatically shifting the box from one stocking form to another after the box has completed a lowering and raising cycle. Another object is to provide a structure of this type, including means for automatically latching the carriage against movement in one direction, after it is shifted step by step by its automatic control means; such latching mechanism being combined with a throw-on and throw-off device adapted to operate at the ends of the carriage movement to automatically raise or lower the latch.

With the foregoing objects outlined and with other objects in view which will appear as the description proceeds, the invention consists in the novel features hereinafter described in detail, illustrated in the accompanying drawings, and more particularly pointed out in the appended claims.

Referring to the drawings,—

Fig. 1 is a front elevation of the improved mechanism.

Fig. 2 is a rear elevation of the same.

Fig. 3 is an enlarged vertical sectional view of a detail, showing the means for shifting the spray box step by step.

Fig. 4 is a horizontal sectional view on the line 4—4 of Fig. 3.

Fig. 5 is an enlarged transverse sectional view of the mechanism.

Fig. 6 is a top plan view partly in horizontal section, of a fragment of the spray box and the valve operating levers.

Fig. 7 is a fragmentary side view of the spray box, showing one of its valves held in closed position by an actuating arm on the box carriage.

Fig. 8 is a similar view, but showing the valve in open position, after the box has descended relatively to said valve lever actuating arm.

Fig. 9 is an enlarged transverse vertical sectional view of a detail of the mechanism shown in Figs. 3 and 4.

Fig. 10 is an enlarged transverse sectional view of the spray box, and illustrating the manner in which the jets of air and water are directed on to the stocking carried by a form.

Fig. 11 is a side view of one of the stocking form supporting brackets.

Fig. 12 is a top plan view of the same.

Fig. 13 is an edge view of one of the stocking forms detached from the frame.

Fig. 14 is a front elevation of the same.

In the drawings, 1 indicates a frame which may include a table 2, that is provided at its forward side with a moisture receiving trough 3. The table is longitudinally slotted as shown at 4 (Fig. 5), and below the slot and the table top, a supported pipe 5 is mounted in brackets 6, which are supported by the frame. This support pipe carries brackets 7 which have upper and lower arms 8 and 9 that terminate in rings to receive a depending cylindrical post 10 of one of the electrically heated stocking forms 11 as indicated. This form has a depending pin 12 (Fig. 14), projecting in the same direction as the post 10, and is designed to engage an ear 13 projecting from the bracket arm 8 to limit the turning of the form after its post has been inserted into the rings of the bracket arms.

As shown in Figs. 1 and 2, the frame supports a series of the forms 11, and of course, there will be a support bracket 7 for each form. Each form is preferably flat, and of the general contour of a stocking, as shown, and is provided with internal electric heating means 11$^a$ (Fig. 14). The current for such means is supplied by wires 14, which extend to an electrical connection 15. These connections cooperate with complementary electric connections 16, mounted on a conduit 17 that supports the line wires.

From the above description, it will be apparent that each of the heated forms is detachably mounted on the frame, and that electrical connection is also detachably made so that, when desired, one form may be substituted for another.

These forms project upwardly from the table, but they are arranged on an incline, as shown in Fig. 5, in order that each one may cooperate with a spray box 18 which is adapted to slide up and down on tracks 19, mounted on a carriage 20, which is shiftable lengthwise of the table. The spray box has imperforate walls, but its top and bottom are slotted (see 18$^a$) to permit any one of the stocking forms to project into and through the spray box when the latter is lowered. The spray is preferably supplied by a compressed air conducting pipe 21, and a pressure water pipe 22. These pipes are flexible and are connected to any suitable source of compressed air and pressure water (not shown), and they extend through a flexible cable 23, and supply the water and compressed air to rigid pipes 24 and 25, which are mounted on the spray box, and are provided within the box with suitable nozzles 24$^a$, 25$^a$, so as to apply the spray to a stocking when the box 18 is moved downwardly and then upwardly relatively to the stocking form. Proper air and water pressure, in connection with careful relative positioning of the nozzles, insures a desired spray of moisture for equal distribution over the entire stocking. The air and water pipes 24 and 25 are provided respectively with control valves 26 and 27 having operating levers numbered 28 and 29 respectively. As best shown in Figs. 6 to 8 inclusive, when the spray box is in its uppermost position, these levers engage a stationary arm 30 which is fixed on the upper end of carriage 20. On the other hand, when the spray box is moved downwardly away from the arm 30, springs 31, which connect the levers to stationary fingers 32 on the pipes 24 and 25, act to pull the levers into position to open the valves 26 and 27. In this way the spray is automatically turned on, and cut off, whenever the box 18 is lowered, and afterwards raised. The box, as shown, is lowered by the operator, who grasps a handle 33 for this purpose. This handle is fast on the box. The box is steadied by a counterweight 34 which slides up and down on rod tracks 35 that are mounted at the rear of the carriage 20. Cords 36 pass over pulleys 37 mounted at the upper end of the carriage, and these cords connect the spray box 18 to the counterweight 34. Consequently, when the spray box is pulled downwardly by the operator, the counter-weight is raised, and then as the operator releases the spray box, the counterweight acts to steady the spray box while the latter is being raised to its uppermost position by means hereinafter described.

Movements of the spray box are taken advantage of for the purpose of controlling the shifting of the carriage 20 along its supporting tracks 38 and 39. These tracks are mounted on the frame rearwardly of the table 2. One of the cords 36 is extended as shown in Figs. 2 and 3, and is provided at its end with a pulley 40. This pulley constantly engages a trigger rope 41, one end of which is anchored to the frame at 42, and the other end of which is connected to a valve control lever 43. The rope 41 is guided by pulleys 44 on the carriage 20, and by pulleys 45 and 46 on the frame. When the spray box is lowered, one of the cords 36 will raise the pulley 40 to cause the cord 41 to shift the lever 43 toward the right in Fig. 2. On the other hand, when the spray box is raised, a spring 47 (Fig. 2), which has one of its ends anchored to the frame, and its other end secured to the lever 43, will return the lever to its normal position.

A spring 48, supported by the carriage 20, carries a pulley 49 which acts to take up the slack in the portion of the rope 36 which carries the pulley 40.

Movements of the lever 43 are used to control a valve (not shown), which admits or discharges a pressure fluid from a ram cylinder 50. This cylinder houses a piston, (not shown), whose rod 51 projects from one end of the cylinder, and is connected to one end of a cable 52 that is guided by pulleys 53 mounted on the frame. The other end of this cable is connected to a belt 54, which reciprocates in a guideway 55 that is mounted on an auxiliary table 56 at the rear portion of the frame. The other end of the reciprocating belt is secured to a cord 57 which carries a counter-weight 58 and is guided by a pulley 159, mounted at the end of the frame opposite to the end which carries the guide pulley 45.

It will be understood from the above, that when the lever 43 in Fig. 2 is moved toward the right, a pressure fluid will be admitted to the cylinder 50, and consequently, the piston rod 51 will be moved toward the left for the purpose of pulling the cord 52 and moving the belt 54 toward the right. Then, as soon as the trigger cord 41 is permitted to slack by the pulley 40, the spring 47 will throw the lever 43 toward the left, and then the counter-weight 58 will function to pull the belt 54 and the piston rod 51 back into the positions shown in Fig. 2.

The reciprocating belt 54, as shown in Fig. 3, carries a number of spaced angular lugs 59 that cooperate with a roll abutment 60, and a pivoted gate 61 which moves along the frame with the carriage 20. For this purpose, the carriage has rearwardly extending arms 62, which carry a shoe 63 that moves over the guide 55 (see Fig. 5). This shoe, as best shown in Figs. 3 and 4, is connected to the lower ends of the counter-weight guide rods 35, and is of inverted U-shape cross sectionally (Fig. 9). It cooperates with the abutment roll 60, and this roll has laterally extending pintles 64 that are adapted to ride on the side edges 66 of the guide 55, when the belt 54 is moving in the direction of the arrow A in Fig. 3. The abutment roll 60 normally occupies the position B in Fig. 3, when the carriage 20 and spray box are at rest, and in such position, the trunnions 64 rest on tracks 67, mounted in spaced relation internally on the sides of the shoe 63, by means of screws or bolts 68, for example. In such position, the periphery of the abutment roll engages a friction pad 69, fixedly positioned within the shoe, and this prevents accidental movement of the roll toward the left in Fig. 3, from the position B. This abutment roll is permanently connected to one end of a cord 70, which is guided by a pulley 71, mounted on the shoe, and is provided at its other end with a pulley 72. A cable 73 which has one of its ends fixed to the upper end of the carriage 20 at the point 74, passes about the pulley 72, and then extends over a pulley 75 mounted on the upper end of the carriage 20, to the spray box 18, and has its opposite end connected to the latter. Therefore, when the spray box is lowered, the pulley 72 will be pulled upwardly, and this will cause the cord 70 to pull the abutment roll 60 from the position B in Fig. 3, to the position C in that figure, where it will contact with one of the lugs 59 of the belt 54. It will be remembered that each time the spray box is lowered, the pulley 40 will operate the trigger cord 41, with the result that the piston rod 51 will be moved into its cylinder, so that the belt 54, at about the time the left end lug 59 (Fig. 3) is engaged by the abutment roll 60, will be slowly shifted in the direction of the arrow A, and in shifting, it will cause the cord 70 to pull the pulley 72 downwardly, and raise the spray box. As the belt 54 moves in the direction of the arrow A, the shoe 63 will remain stationary, while the trunnions 64 of the abutment roll will slide along the edges 66 of the belt guide, and will move beneath the shoe tracks 67. To prevent the trunnions of the abutment roll from riding up the inclined edges 75 of the shoe tracks 67 while the belt is moving in the direction of the arrow A, the shoe is provided with a longitudinally slidable gate 76, which is pulled toward the track 67 by a spring 77. This gate allows the abutment roll 60 to move from the position B to the position C, that is, from the shoe tracks 67 on to the frame tracks 55, but prevents the abutment roll from riding up the inclines 75 on to the shoe tracks 67, while the belt 54 is moving in the direction of the arrow A. While the belt is moving toward the right, in Fig. 3, the right hand one of the belt lugs 59 will move from the position which it occupies in this figure, and when the abutment roll reaches the pivoted gate 61, it will swing that gate in a counter-clock-wise direction, and allow the trunnions 64 of the abutment roll to rise on inclined tracks 78, which are mounted internally on the sides of the shoe 63. This will permit the trunnions 65 to rise on to the front inclines 79 of the shoe tracks 67, and will also allow the gate 61 to fall back into its original position at the left hand side of the belt lug 59, which has just carried the abutment roll over to the inclined tracks 78. About the time that one of the belt lugs 59 has carried the abutment roll over to permit it to come into position B, the spray box will have ascended to a point where the pulley 40 in descending, will allow the trigger cord 41 to slack, so that the spring 47 will close the valve controlled by the lever 43, and thus allow the counter-weight 58 to pull the belt 54 in a direction opposite to the arrow A. Consequently, one of the lugs 59 of the belt, now coming in contact with the gate 61, will act to shift the entire carriage 20 and the parts which it supports, one step to the left in Fig. 3, so that the spray box will be brought into position to cooperate with the next stocking form 11 of the series.

The gate 61 is pivotally mounted at the point 80, and its movement in one direction is limited by a stop 81, carried by the shoe, so that the abutment roll 60 will be prevented by the gate from discharging forwardly off the high end of the inclined tracks 78.

In order to prevent the shoe and carriage from moving in the direction of the arrow A, while the abutment roll 60 is being moved in that direction by the belt 54, the shoe is provided with a pivoted pawl 82 (see Figs. 4 and 9), which drops into spaced notches 83 in a rail 84 that is mounted on the auxiliary table 56, alongside of the belt tracks 55. The notches 83 are positioned to accord with the arrangement of the stocking forms 11, whereby the pawl 82 will be engaging a notch when the spray box is in position to be raised and lowered about any one of the forms 11. When the carriage is shifted toward the left (Fig. 3), the pawl simply drags over the track 84, but when the carriage arrives at the end of the series of forms 11, it is necessary to lift the pawl, for otherwise it would interfere with the manual movement of the carriage 20 back to starting position at the beginning of the series. For the purpose of automatically raising and lowering the pawl at the ends of the path travelled by the carriage, the pawl is provided with a projecting cam surface 85 that is engaged by a pin 87, fixed on a slide member 88 that is carried by the shoe 63. The slide 88 is slotted and rests on a shelf 89 that projects from the forward side of the shoe, and bolts 90 pass through the slot of the slide, and slidably connect the latter to the shelf 89. The ends of the slide 88 project lengthwise beyond the ends of the shoe 63 (see Figs. 3 and 4), and these extremities contact at the ends of the path of travel of the carriage with fixed stops 91 and 92 (Fig. 1), arranged at the ends of the frame. When the slide 88 strikes the stop 91, the pin 87 will lift the pawl 82 out of engagement with the notched rail 84, and then the operator can push the carriage 20 back to the starting end of the series, and in such movement, of course, the spray box 18 will be at its upper limit of travel, so that the stocking forms will not interfere with the movement of the carriage. Upon approaching the starting end of the series, the slide 88 will strike the stop 92, with the result that the slide will be forced back to its initial position, to allow the pin 87 to disengage the cam 86 and permit the pawl to swing down on to the notched rail 84.

From the above description, it is believed that the operation will be clear, but briefly, by way of repetition, it may be stated at the outset that the operator mounts a series of stockings on forms 11 on the brackets 7 of the apparatus, which forms are joined by electrical connections 15 of the same to the electrical connections 16 of the line wires. At this time the carriage 20 will be at the end of the frame where the stop 92 is located, and the roll abutment 60 will be in the position B of Fig. 3. Now the operator grasps the handle 33 of the spray box and pulls the same downwardly over the first stocking form of the series. As the box descends, the levers 28 and 29 of the liquid and air control valves will disengage the arm 30, and the springs 31 will throw the valves to open position. Therefore, before the spray box reaches the stocking form, the spray will be turned on, and the stocking will be evenly moistened, while the spray box is descending, as well as ascending. As the spray box moves downwardly, the pulley 40, acting on the trigger cord 41, will shift the lever 43 which controls the ram, so that the pressure fluid admitted to the cylinder 50 will now draw the piston rod 51 into its cylinder, and the belt 54 will begin to move in the direction of the arrow A in Fig. 3. Just prior to this, the abutment roll 60 will be drawn by its cord 70 from its B position to its C position, so that the belt in shifting in the direction of the arrow A, will commence to draw the pulley 72 downwardly, and thus raise the spray box.

As soon as the abutment roll 60 has been moved by one of the lugs 59 of the belt, on to the inclined tracks 78 of the shoe, this lug will have moved to the right of the gate 61, so that the gate in returning to normal position, will shift the abutment roll into the position B, and at the same time, the gate will come into position to be engaged by the same lug, when the belt is shifted by the counterweight 58 in the opposite direction, for the purpose of feeding the carriage to the next stocking form of the series. Obviously, just before the shifting of the carriage to the next form, the pulley 40 has loosened the trigger cord 41, so that the spring 47 has returned the lever 43 to its original position to allow the pressure fluid to exhaust from the cylinder 50.

This operation will be repeated for each stocking form, and the pawl 82 will cooperate with the notches 83 of the rail 84, each time the carriage is halted, to hold the carriage in position whenever the abutment roll 60 is being moved by the belt 54, from the position C to the position B.

A leaf spring 93, within the shoe 63, cooperates with the incline 75 of the shoe tracks 67, to cause the abutment roll to descend, while it is travelling off the tracks 67, on to the belt tracks 55.

It is believed from the foregoing description, that the construction, operation and advantages of the invention may be readily understood by those skilled in the art, and it is apparent that changes may be made in the details disclosed, without departing from the spirit of the invention, as expressed in the following claims.

What I claim and desire to secure by Letters Patent is:

1. An apparatus for conditioning hosiery or the like, including a relatively stationary form adapted to support a stocking, a spray member mounted for movement lengthwise of the form, and spray nozzles carried by the spray member and adapted to direct water spray on to the stocking from opposite sides thereof.

2. An apparatus for conditioning hosiery or the like, including a relatively stationary form adapted to support a stocking, a spray box movable lengthwise of the form and having opposite open ends to permit the form to pass through the box when the latter is moved lengthwise of the form, and means within the box for spraying liquid on to the stocking carried by the form, from opposite sides of the latter.

3. An apparatus as claimed in claim 2, including means for automatically feeding the box at a constant speed in one direction relatively to the form.

4. An apparatus as claimed in claim 2, including means for automatically turning the water spray off and on while the box is moving lengthwise of the form.

5. An apparatus as claimed in claim 2, in which the spray box is manually movable in one direction, and means for automatically moving the box at a constant speed in the opposite direction.

6. An apparatus for conditioning hosiery or the like, including a series of form members adapted to support stockings, a spray member adapted to cooperate with each of the form members, and provided with nozzles for directing liquid on to each stocking from opposite sides thereof, one of said members being movable relatively to another one of the members, lengthwise of the form members, the spray member being shiftable along the series of form members for moistening the stockings in sequence.

7. An apparatus for conditioning hosiery or the like, including a series of relatively stationary forms, each adapted to support a stocking, a carriage movable along the series of forms, a spray member mounted on the carriage and adapted to be moved lengthwise of any one of the forms, and nozzles carried by the spray member and adapted to direct water on to each of the stockings from opposite points when the spray member is moved lengthwise of any one of said forms.

8. An apparatus for conditioning hosiery or the like, including a series of spaced relatively stationary stocking forms adapted to support stockings, a carriage movable along the series of forms, a spray box movably mounted on the carriage and having open opposite ends through which one of the forms may pass when the spray box is moved lengthwise thereof, said box being manually movable in one direction, water spraying nozzles carried by the box and adapted to spray water on to a stocking carried by any one of the forms, when the spray box is moved lengthwise of the form, and automatic means for moving the spray box at a constant speed in the opposite direction.

9. An apparatus as claimed in claim 8, in which the automatic means for moving the spray box in one direction includes a reciprocating belt having spaced lugs thereon, an abutment adapted to engage any one of the lugs on the belt, means operatively connecting the abutment to the spray box for causing the spray box to move in one direction when the abutment is moved in a certain direction by one of the lugs of the belt, and means for reciprocating said belt.

10. An apparatus as claimed in claim 8, in which the means for automatically moving the spray box in one direction, includes a reciprocating belt having spaced lugs thereon, an abutment adapted to be moved by any one of said lugs, cords and pulleys operatively connecting the abutment to the spray box, and means for reciprocating said belt.

11. An apparatus as claimed in claim 8, in which the means for automatically moving the spray box in one direction, includes a reciprocating belt provided with spaced lugs, an abutment adapted to be engaged with any one of the lugs of the belt, a cord having one of its ends secured to the box and its other end secured to the carriage, a guide pulley for said cord, a cable, a guide pulley for the cable, a pulley connected to one end of the cable and engaging said cord, the opposite end of the cord being connected to said abutment, and means for reciprocating said belt.

12. An apparatus as claimed in claim 8, in which the means for automatically moving the spray box in one direction, includes a reciprocating belt, means for moving the belt in one direction, a ram for moving the belt in the opposite direction, a control member for the ram, and means operatively connecting said control member to the spray box, whereby when the latter is manually moved in one direction, the control member will cause the ram to move the belt.

13. An apparatus as claimed in claim 8, in which the means for automatically moving the spray box in one direction, includes a reciprocating belt provided with spaced lugs, and abutment engageable with any one of the belt lugs and operatively connected with the spray box, a shoe provided with means for elevating the abutment out of engagement with any one of the belt lugs to allow the lug to pass beneath the abutment, and a movable member mounted on the shoe and adapted to be engaged by any one of said lugs for shifting the carriage in one direction.

14. In a hosiery conditioning apparatus, a series of forms adapted to support stockings, a carriage movable along the forms, a spray box movably mounted on the carriage and adapted to cooperate with any one of the forms for spraying a stocking mounted thereon, said spray box being manually movable in one direction, and means for automatically moving the spray box in the opposite direction at a constant speed.

15. In a hosiery conditioning apparatus, a series of forms adapted to support stockings, a carriage movable along the forms, a spray box movably mounted on the carriage and adapted to cooperate with any one of the forms for spraying a stocking mounted thereon, said spray box being manually movable in one direction, and means for automatically moving the spray box in the opposite direction at a constant speed, said last mentioned means including a belt provided with spaced lugs, means for moving the belt in one direction, an abutment adapted to engage any one of the belt lugs and to move with the latter, and flexible means operatively connecting said abutment to the spray box.

16. In a hosiery conditioning apparatus, a series of forms adapted to support stockings, a carriage movable along the forms, a spray box movably mounted on the carriage and adapted to cooperate with any one of the forms for spraying a stocking mounted thereon, said spray box being manually movable in one direction, and means for automatically moving the spray box in the opposite direction at a constant speed, said last mentioned means including a cord having one of its ends connected to the spray box and its other end connected to the carriage, a guide for the cord carried by the carriage, a pulley engaging said cord, a cable having one of its ends secured to the pulley, means for guiding the cable, an abutment connected to the other end of the cable, and means engageable with and disengageable from the abutment for moving the latter to pull the cable and tauten the cord, and thereby move the spray box.

17. An apparatus for conditioning hosiery or the like, including a series of spaced forms adapted to support stockings, a carriage movable along the series of forms, a spray box movably mounted on the carriage and having opposite open ends to permit either one of the forms to pass through the box when the latter is moved lengthwise of the form, spray nozzles carried by the box for directing jets of moisture on to the stocking carried by the form, said box being manually movable in one direction, means including a belt for automatically moving said box in the opposite direction, control mechanism for the last mentioned means connected to the spray box for causing the last mentioned means to actuate when the spray box is manually moved in one direction, whereby the belt is caused to move in one direction, and means operatively connecting the box to the belt for causing the latter to automatically move the box in the opposite direction when the belt is moved in one direction.

18. In an apparatus of the class described, supporting tracks, a carriage movable along the tracks, a spray box mounted for reciprocation on the carriage, a shoe movable with the carriage, a reciprocating belt having spaced lugs, a gate on the shoe adapted to be engaged by any one of the belt lugs for moving the shoe in one direction when the belt moves in that direction, an abutment cooperating with the shoe and belt lugs, the shoe being provided with means for elevating the abutment out of contact with any one of the belt lugs, and in elevating the abutment to shift the gate to allow the latter to assume a position on the opposite side of one of the belt lugs after the latter has passed beneath the gate, and means operatively connecting the abutment to the spray box for automatically shifting the latter along the carriage in one direction when the belt is moved in a certain direction.

19. In an apparatus of the class described, a carriage, a reciprocating belt for moving the carriage step by step, a spray box mounted for reciprocation on the carriage, a ram for moving the belt in one direction, a control member for the ram, a trigger cord having one of its ends connected to the control member, and its other end anchored at a fixed point, guides for the trigger cord arranged on the carriage, and means for tautening the trigger cord for actuating the control member when the spray box is moved in one direction.

20. In an apparatus of the class described, a series of spaced forms adapted to support stockings, a carriage movable along the forms, a spray box mounted for reciprocation on the carriage and adapted to cooperate with stockings on the forms in sequence for applying moisture to the stockings, said box being manually movable downwardly, guides at the upper end of the carriage, cords passing over the guides and having their front ends connected to the box, and a counter-weight connected to the cords.

21. In an apparatus of the class described, a series of stocking forms, a carriage adapted to move step by step from one form to the next, a spray box movable upwardly and downwardly on the carriage and adapted to cooperate with any one of the forms to apply moisture to a stocking carried thereby, means for latching the carriage in position against movement in one direction while the spray box is cooperating with any one of the forms, and means for placing the latching means in an inoperative position when the carriage reaches one end of its path of movement.

22. In an apparatus of the character described, supporting tracks, a carriage movable step by step along the tracks, a spray box mounted for reciprocation on the carriage, a reciprocating belt provided with spaced lugs, a shoe movable with the carriage and arranged adjacent to said belt, an abutment cooperating with the belt lugs and the shoe, and adapted to be moved in one direction by the belt, means operatively connecting the abutment to the spray box for moving the abutment lengthwise of the shoe when the spray box is moved in one direction, said shoe being provided with elevating tracks and a spring closed gate to permit the abutment to move from the elevating tracks to the belt, when the spray box is moved in one direction.

23. An apparatus of the class described, including a rectilinear series of spaced forms adapted to support stockings, tracks extending along said series of forms, a carriage mounted on the tracks and movable step by step from one form to the next of the series, a reciprocating spray box mounted for movement on the carriage lengthwise of any one of said forms, nozzles carried by the spray box and adapted to direct water spray on to a stocking from opposite points when the spray box is moved along the stocking, and means for feeding compressed air and water under pressure to said nozzles.

24. In combination, a relatively flat internally heated stocking form, means for supporting said form from the lower end of the latter, tracks positioned adjacent to the form and extending lengthwise thereof, a reciprocating spray box mounted on said tracks for movement upwardly and downwardly and having opposite open ends to permit the stocking form to extend through the box when the latter is moved downwardly, nozzles carried by the box and directed toward the form from opposite points, and means for feeding compressed air and water under pressure to said nozzles.

In testimony whereof we affix our signatures.

WILLIAM H. GOSCH.
HENRY W. SHERMAN